(No Model.)
L. H. GEAR.
MOUSE TRAP.
No. 338,399. Patented Mar. 23, 1886.
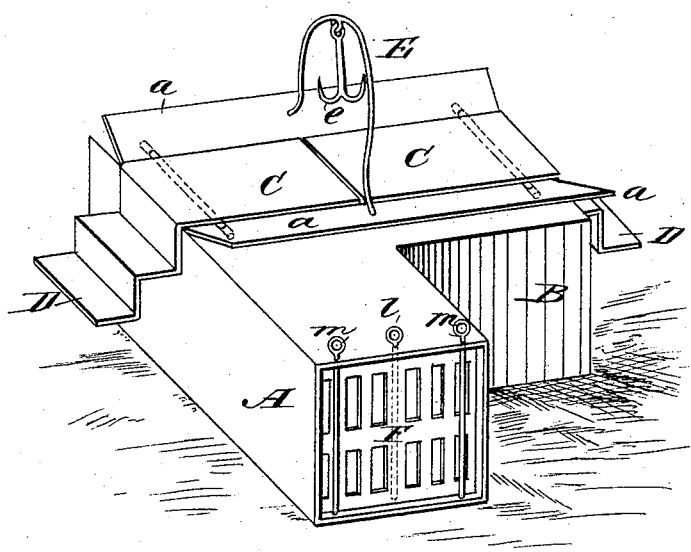
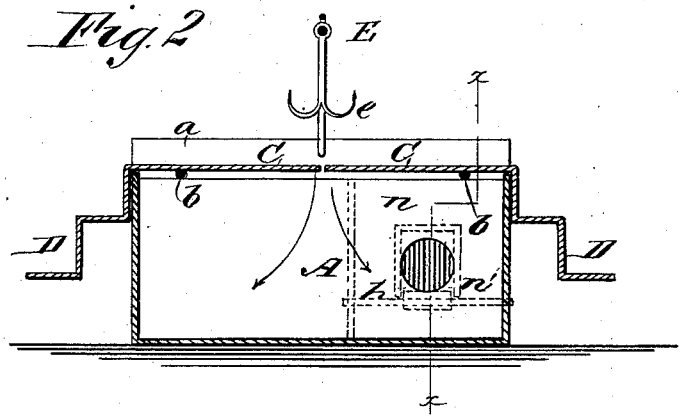
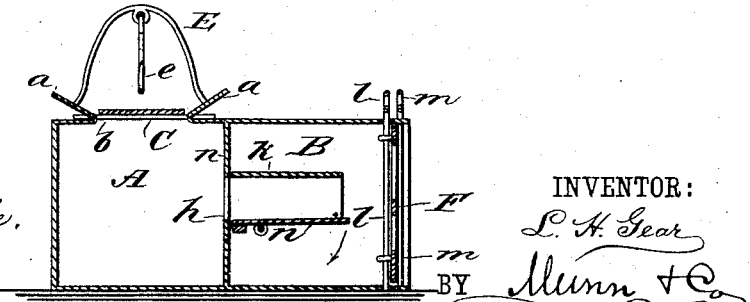
WITNESSES:
F. McArdle
C. Sedgwick
INVENTOR:
L. H. Gear
BY Munn & Co
ATTORNEYS.

UNITED STATES PATENT OFFICE.

LESTER H. GEAR, OF MENTOR, IOWA.

MOUSE-TRAP.

SPECIFICATION forming part of Letters Patent No. 338,399, dated March 23, 1886.

Application filed December 4, 1885. Serial No. 184,668. (No model.)

*To all whom it may concern:*

Be it known that I, LESTER H. GEAR, of Mentor, in the county of Bremer and State of Iowa, have invented a new and Improved Mouse-Trap, of which the following is a full, clear, and exact description.

The object of my invention is to provide a trap which shall be automatic in its action, and by means of which any number of mice may be caught without resetting the trap; and a further object of my invention is to provide a trap with two compartments, which are so arranged that the mice can freely enter from the first to the second compartment, but cannot pass back from the second to the first.

Reference is to be had to the accompanying drawings, forming a part of this specification, in which similar letters of reference indicate corresponding parts in all the figures.

Figure 1 is a perspective view of my improved mouse-trap. Fig. 2 is a vertical sectional view of the same, the view being taken through the center of the main compartment. Fig. 3 is a sectional view of the trap, taken through the center of the auxiliary compartment and the end of the main compartment.

The trap illustrated in the drawings is preferably made of tin or other form of sheet metal; and it consists of two compartments, A B, the metal which would otherwise constitute the upper wall of the compartment A being cut down through its longitudinal center and a short distance back from said center at either end, so as to form leaves $a$ $a$, which may be folded back, as best shown in Figs. 1 and 3. The open space thus formed above the compartment A is closed by strips or leaves C C, which are pivotally mounted on rods $b$ $b$, and provided with outwardly-extending corrugated or step-like projections D D, which overbalance the leaves C C, thus normally holding them in the positions shown in the drawings.

Just above the meeting edges of the leaves C C, I form a wire arch, E, from which there is suspended a bait-hook, $e$, so that as the animal climbs up the corrugated or step-like projections D and passes onto the leaves C to secure the bait, his weight will overbalance the extensions D and the leaf upon which he is standing will rock downward in the direction of the arrow, and the mouse will fall within the compartment A, but immediately after being freed from the weight of the mouse the leaf will return to the position shown in the drawings.

In the dividing-wall $n$, between the compartments A B, there is an opening, $h$, and above this opening there is an outwardly-projecting hood, $k$. Just in front of the opening $h$ there is arranged a pivotally-mounted and weighted trap or board, $n'$, so arranged that an animal passing from the compartment A into the compartment B must pass over the board, which will tip forward in the direction of the arrow with the weight of the animal; but the weight at the short end of the board will return it to the position shown in Fig. 3 and prevent the animal from returning to the compartment A.

When the mice are to be removed from the compartment B, a door, F, which is centrally and pivotally held by the rod $l$, is swung around upon its pivotal connection, in order that the animals may drop into a pail of water or other receptacle provided for them, the door F being held in a closed position, except at the time mentioned, by means of the bars $m$, arranged, as shown, near either end and upon the outside of the door.

With such a trap as I have described there is very little trouble experienced in setting the trap, and having been once set may remain undisturbed so far as the housekeeper is concerned until the bait is exhausted.

Having thus described my invention, what I claim as new, and desire to secure by Letters Patent, is—

1. The mouse or animal trap, comprising the cage having the tilting plates hung in an opening in the cage, and having stepped outer ends, and the bait-suspending hook arranged upon the outwardly and upwardly inclined plates of the cage, substantially as and for the purpose set forth.

2. In a mouse-trap, the combination, with the cage, of the pivoted or tilting plates hung in an opening in the cage, and having stepped outer ends, and the bait-suspending hook disposed upon the cage intermediately of the pivots of said pivoted or tilting plates, substantially as and for the purposes set forth.

LESTER H. GEAR.

Witnesses:
WILLIAM SCOTT,
FRED. L. BLUMENBERG.